US012795583B2

(12) United States Patent
Allgaier et al.

(10) Patent No.: US 12,795,583 B2
(45) Date of Patent: Nov. 10, 2026

(54) SYSTEM AND METHOD FOR TRANSMITTING SENSOR DATA AND POSITIONAL INFORMATION, AND COMMUNICATION MODULE AND SENSOR

(71) Applicant: VEGA Grieshaber KG, Wolfach (DE)

(72) Inventors: Volker Allgaier, Haslach i.K. (DE); Andreas Isenmann, Haslach i.K. (DE); Clemens Hengstler, Haslach (DE); Florian Burgert, Gengenbach (DE)

(73) Assignee: VEGA Grieshaber KG, Wolfach (DE)

( * ) Notice: Subject to any disclaimer, the term of this patent is extended or adjusted under 35 U.S.C. 154(b) by 753 days.

(21) Appl. No.: 18/173,192

(22) Filed: Feb. 23, 2023

(65) Prior Publication Data

US 2023/0269697 A1 Aug. 24, 2023

(30) Foreign Application Priority Data

Feb. 23, 2022 (DE) ..................... 10 2022 104 331.2

(51) Int. Cl.
*H04W 64/00* (2009.01)

(52) U.S. Cl.
CPC .................................. *H04W 64/00* (2013.01)

(58) Field of Classification Search
CPC ..................................................... H04W 64/00
USPC ....................................................... 455/456.1
See application file for complete search history.

(56) References Cited

U.S. PATENT DOCUMENTS

2005/0192029 A1* 9/2005 Aigner .................. H04W 64/00 455/456.1
2018/0206177 A1* 7/2018 Daoura ................... H04W 4/80
2019/0349709 A1 11/2019 Kim et al.
2021/0204095 A1 7/2021 Luomi

FOREIGN PATENT DOCUMENTS

DE 102018222376 A1 6/2020
EP 3128805 A2 2/2017
WO 2020214709 A1 10/2020

OTHER PUBLICATIONS

EP 23154182.2 Office Action dated Aug. 7, 2025.
Recherchebericht (Search Report) issued on German Appln. No. 10-2022-104331.2 on Oct. 4, 2022.
EP 23154182.2 Search Report dated Jun. 9, 2023.

* cited by examiner

*Primary Examiner* — Michael R Neff
(74) *Attorney, Agent, or Firm* — Wood Herron & Evans LLP

(57) ABSTRACT

A system for transmitting sensor data and positional information of a sensor comprises a data collection unit (6) receiving sensor data (9) from at least one sensing unit (3) detecting a physical quantity and generating sensor data (9). A first output unit (4) is configured for outputting generated sensor data (9) to the data collection unit (6), and a second output unit (5) is configured for emitting beacons (10) into a crowdsourcing network (12). The beacons (10) are configured for triggering in the crowdsourcing network (12) positional information, and transmission of the positional information to the data collection unit (6), using at least one subscriber device (11) of the crowdsourcing network (12). A communication module and a sensor for use in such a system and a corresponding method are also disclosed.

14 Claims, 2 Drawing Sheets

SYSTEM AND METHOD FOR TRANSMITTING SENSOR DATA AND POSITIONAL INFORMATION, AND COMMUNICATION MODULE AND SENSOR

CROSS REFERENCE TO RELATED APPLICATIONS

This patent application claims the benefit of German patent application DE 10-2022-104331.2 filed on Feb. 23, 2022, which is hereby incorporated by reference in its entirety.

FIELD OF THE INVENTION

The invention relates to a system and a method for transmitting sensor data and positional information, as well as to a communication module that can be used for this purpose and a sensor that can be used for this purpose.

BACKGROUND OF THE INVENTION

Sensors have at least one sensing unit with which a physical quantity can be detected. This physical quantity may include a distance, a length, a volume, a filling level, a pressure, a temperature, a concentration, a flow rate, a humidity, a light intensity, a voltage, a current and/or the like, for example. From the detected physical quantity, sensor data are obtained that are output for further use. The recipient of the sensor data may be a data collection unit, which collects, stores and optionally forwards the obtained sensor data to an evaluation. In this case, the sensor and the data collection unit are frequently located at different locations.

In practice, not only the sensor data themselves are of interest, but also the position of the sensor that obtained the sensor data. This positional information can be used in a variety of ways. Exemplary reference may be made to a simpler mapping of the sensor data in a production line or an industrial plant, a mapping in the case of movably arranged sensors (e.g. in or on vehicles), an improved ease of finding the sensor during maintenance or the like.

In the case of sensors arranged in stationary environments, the position may be manually stored in an inventory system. However, this approach requires a lot of effort and is prone to error.

Another approach is to equip the sensors with position determining units. These position determining units may use a GNSS—Global Navigation Satellite System—which is formed, for example, by GPS—Global Positioning System—or Galileo. However, such position determining units require a sufficient signal strength of the satellite signals, which excludes a measurement in a basement or under a metal roof and makes it very energy-intensive. Moreover, these position determining units generate not inconsiderable additional costs.

Another problem is the result of the transmission of the positional information from the sensor to the data collection unit. An approach in which a measurement value is always transmitted together with positional information of the associated sensor provides for a particularly reliable assignment of positional information to the sensor data. However, the data volume to be transmitted is thus not inconsiderably increased. Particularly in the case of wireless transmissions, this results in a considerable additional load on the transmission path. In addition, the life of the battery is reduced in the case of battery-operated sensors.

The invention is based on the object of providing a system, a communication module, a sensor and a method with which sensor data and positional information can be transmitted in a cost-effective, energy-efficient, and resource-saving manner.

This object is achieved by the combinations of features of the coordinated claims.

Other particularly advantageous embodiments are disclosed by the respective subclaims.

It must be noted that the features cited individually in the claims can be combined with each other in any technologically meaningful manner (also across the boundaries of categories, such as method and device) and represent other embodiments of the invention. The description, in particular in connection with the Figures, additionally characterizes and specifies the invention.

It is also noted that a conjunction "and/or" used hereinafter, which is situated between two features and links them to each other, should always be interpreted such that, in a first embodiment, only the first feature may be provided, in a second embodiment, only the second feature may be provided, and in a third embodiment, both the first and the second feature may be provided.

SUMMARY OF THE INVENTION

The present disclosure makes use of the insight that a resource-saving acquisition and transmission of positional information can be achieved with a so-called crowdsourcing network and subscriber devices of this crowdsourcing network. Such networks use a multitude of subscriber devices, which cooperate when locating a device and send positional information obtained thereby to authorized inquirers.

For example, such a crowdsourcing network may be the "Find My"-network by Apple Inc. There, a device to be located is referred to as an "AirTag". An AirTag cyclically emits an identifier via Bluetooth, which can be received by subscriber devices of the "Find My"-network within the transmitting range of the AirTag. Using mostly satellite-based positional information of the subscriber device, positional information of the AirTag is obtained and made available in the cloud for an authorized inquirer. In this manner, the position of a lost key ring, for example, can be determined or at least narrowed down.

Similar approaches for crowdsourcing networks are offered and sold by, for instance, Tile Inc., Chipolo Inc. and Samsung Electronics, to name but a few providers.

By using such a crowdsourcing network, the transmission of sensor data and positional information is split up in the present disclosure: The sensor data are transmitted via a first path, the positional information via a second path, i.e. via the crowdsourcing network. For this purpose, the sensor comprises a first output unit and a second output unit, wherein the first output unit is configured for outputting generated sensor data to the data collection unit, and the second output unit for emitting beacons into the crowdsourcing network. These beacons can be received and forwarded into the crowdsourcing network by subscriber devices of the crowdsourcing network located in a receiving range around the second output unit. In this case, the beacons are configured such that they can trigger in the crowdsourcing network a generation of positional information and a transmission of this positional information to the data collection unit. How this function can be specifically obtained—understandably—depends on the crowdsourcing network used in each case.

The splitting of the transmission into two separate paths permits the optimization of the output units with respect to the respective purpose, which may result in a resource and energy-saving operation of the sensor, and thus of the entire system. By using the crowdsourcing network, moreover, a GNSS receiver or other dedicated position determining units may be dispensed with in the sensors, which may have a favorable effect on the costs and energy consumption. A laborious manual registration of the position of a sensor can be avoided. However, interfaces may be present in the system of the present disclosure, with which the position of a sensor can be automatically registered and tracked in an inventory system. At the same time, the separate paths permit an improved protection against theft, because the positional information can be provided independently from the actual use of a sensor and, for example, always be transmitted to a user who may be considered authorized.

The system according to the present disclosure comprises at least one sensor and a data collection unit. In this case, the crowdsourcing network is not regarded as a constituent element of this system. In practice, the crowdsourcing network may indeed be operated by different provider than the system disclosed herein. The system of the present disclosure comprises interfaces in order to interact with such a crowdsourcing network. For smooth collaboration of the system of the present disclosure and the crowdsourcing network, the interfaces of the system may be adapted in a suitable manner to the crowdsourcing network.

The at least one sensor may have different configurations. Preferably, the at least one sensor is formed by a field device. Each sensor may have at least one sensing unit, which is configured for detecting a physical quantity, and with which the sensor can generate sensor data. Moreover, the sensor may include further constituent elements—depending on its design. For example, the sensor may include a power supply unit (e.g. a battery and/or energy harvesting means), an electronic control system for the sensing unit, an evaluation unit, analog/digital converters, filters, a linearization unit, a display unit and/or other units, to name but a few conceivable constituent elements.

The at least one "sensing unit" may be configured in various manners for detecting various physical quantities. Only by way of example, and not limited thereto, reference is made to the measurement of a distance, a filling level, a temperature, a pressure, a vibration, an orientation, a brightness, a concentration, a humidity, a voltage, a current or a flow rate.

The "output units" do not have to be configured only for outputting. Rather, it is also conceivable that the first output unit and/or the second output unit may also have receiving functionalities in various shapes. Thus, the outputting of generated sensor data may be triggered from outside the sensor, the sensor may be configured, activated or deactivated, or a confirmation of a successful outputting of sensor data may be received, for example. Such receiving functionalities are not an impediment to the use of the output units disclosed herein.

Everything that is required for outputting the data to be outputted may in each case be considered to be included in the "output unit". This may include, for example, an antenna, a signal amplifier, a controller for generating messages or also units for packaging, processing a protocol or coding, to name but a few conceivable constituent elements.

In one embodiment, an "output unit" is a subsystem within the sensor. Thus, an output unit may be implemented in the sensor electronics and/or be a part of a display and/or operating unit. A replaceable display and/or operating unit permits the retrofitting of existing sensors for a use in the system disclosed herein, for example. In another embodiment, an output unit is configured as a separate module which—in a refinement—may be configured to be pluggable and/or even replaceable. This may also facilitate a modular configuration and a retrofitting of existing sensors. In this case, the term "pluggable" may relate to a mechanical pluggability (e.g., the output unit is plugged into a bracket or slot in the sensor housing provided for this purpose) and/or to an electrical pluggability (e.g., the output unit is plugged onto a socket/a plug on or in the sensor housing).

The "data collection unit" may also be configured in various manners. In order for the present disclosure to achieve its usefulness particularly well, one option is for the at least one sensor to be arranged at a distance from the data collection unit. In one embodiment, "at a distance" may mean several tens of meters, in another embodiment several hundred meters, in another embodiment several kilometers, and in yet another embodiment even greater distances. Even global systems can be built.

In this case, it makes sense if the "data collection unit" is formed by a combination of software and hardware. Thus, the data collection unit may also be implemented in a server. However, it is also conceivable that the data collection unit is implemented in a cloud.

In the present case, everything that can be related to a physical quantity detected by the sensing unit is generally considered to be included in the term "sensor data". In one embodiment, the sensor data are digitized measurement values of the sensing unit. In this case, these measurement values may already be processed, e.g. by linearization or an averaging of several measurements. In another embodiment, the sensor data are a strong quantization of a measurement value. For example, the sensor data may indicate that a detected filling level has been reached to an extent of 0%, 25%, 50%, 75% or 100%, to cite an example for only one conceivable quantization. In another embodiment, the sensor data are state variables derived from measurement values. Such state variables may indicate, for example: "filling level in the required range", "filling level below the required range", "filling level above the required range", "filling level at critical low", "filling level at critical high", "filling level above limit level" and "filling level below limit level", to name only one conceivable embodiment of a state variable. For example, these state variables may be represented by integers or natural numbers. This listing of conceivable "sensor data", which is not to be considered to be complete, shows how general the term "sensor data" may be understood to be in principle. On a transmission path from the second output unit to the data collection unit, the sensor data may be encoded in a suitable manner and optionally encrypted.

Generally, a "beacon" is a signal that has a predefined structure, includes predefined information and is usually short. The beacon may be emitted periodically, e.g. once per minute, every 5 minutes, once per hour or once per day, to name but a few conceivable period lengths as an example. In this case, a period length for the beacon may be greater than a period length for the sensor data. The emission of a beacon may also be triggered, e.g. by a request from a user or the data collection unit. The structure of the beacon may depend on the transmission technology of the second output unit. The predefined information may include an identifier of the emitting output unit and/or a time stamp, to name but two conceivable kinds of information. "Short" usually means that the transmission of a beacon requires a maximum of one millisecond, often less than a few microseconds, in part even less than one microsecond.

In one embodiment, the first and second output units are configured for a wireless data transmission. In this way, the sensors can be positioned in a flexible manner. Particularly in the case of the second output unit, a connection with the crowdsourcing network is facilitated, in some cases even made possible at all, by means of a wireless data transmission.

In one embodiment, the first output unit includes a wide area interface, wherein the wide area interface is preferably formed by an interface for LoRaWAN, LTE-M (Long Term Evolution for Machine type communication), NB-IoT (Narrow Band Internet of Things) or GSM (Global System for Mobile communications). A remote data collection unit can be reliably reached by means of a wide area interface without additional gateways for wide area communication having to be provided. In this case, any wide area interface can be used in principle. Since the energy efficiency of sensors used plays a role, LPWAN (Low Power Wide Area Network) is preferably used.

Various classes of network protocols for connecting low-energy devices, such as battery-operated sensors, with a sensor are subsumed under the abbreviation LPWAN. The protocols are designed such that a great range and a low energy consumption of the devices can be achieved at low operating costs. Exemplary LPWAN technologies include LoRaWAN, LTE-M or NB-IoT.

LoRaWAN, which is short for Long Range Wide Area Network, is a standard of the LoRa Alliance. This describes both the radio technology as well as the protocol technology.

LTE-M and NB-IoT are wireless communication standards standardized by 3GPP and available in the 4G mobile network and also under 5G. For example, NB-IoT uses the mobile communication frequencies of the GSM-900 frequency band becoming available due to the continued development of mobile terminal devices towards higher frequency bands.

GSM—Global System for Mobile communications—is a mobile communications standard which was already introduced in the 1990s, but which is still suitable for use for various purposes due to good network development, a large range for radio waves and a relatively efficient communication.

In one embodiment, the second output unit comprises a short-range interface, wherein the short-range interface is preferably formed by an interface for Bluetooth or UWB—Ultra Wide Band. The use of a short-range interface enables communication across short distances. Distances of a maximum of 100 meters, preferably of 50 meters at most, particularly preferably of 25 meters at most, still more preferably of 15 meters at most, are considered “short distances”.

Bluetooth is an industrial standard according to IEEE 802.15.1 for data transmission via radio signal across short distances. Due to the widespread distribution, a universal second output unit can thus be provided.

UWB describes an approach for short-range communication in which a frequency range with a large bandwidth of typically at least 500 MHz or at least 20% of the arithmetic mean between a lower and an upper limit frequency of the frequency band employed is used. The data are transmitted in pulses that are as short as possible. UWB technologies are described in IEEE 802.15.3a or IEEE 802.15.4a, for instance. In this way, a second output unit operating in an energy-efficient manner can be provided. In addition, a “time of flight” process is integrated into some UWB technologies, whereby positional information can be determined with even more accuracy.

In one embodiment, the system additionally comprises an evaluation unit, which evaluates generated sensor data with regard to the compliance with predetermined criteria and generates a warning notification, error notification and/or an alert in the case of non-compliance with predetermined criteria. A predetermined criterion may be, for example, reaching or dropping below a lower threshold value, reaching or exceeding an upper threshold value, or reaching an unfavorable situation. A lower threshold value may be a minimum filling level, a minimum distance, a minimum temperature or a minimum voltage, for example. An upper threshold value may be a maximum filling level, a maximum temperature, a maximum current, a maximum pressure, a maximum vibration amplitude or a maximum voltage, for example. In this case, several criteria may also be predetermined, which trigger different notifications and/or different levels of a notification. For example, a first upper threshold value may trigger a warning notification, and a second upper threshold value an alert. Different criteria may relate to different physical quantities, which in turn cause different warning notifications, error notifications or alerts. In this way, it is possible to react flexibly to conditions detected by one of the sensors.

In an embodiment, the evaluation unit is arranged in the sensor and configured for outputting the warning notification, error notification and/or alert via the second output unit. Thus, an additional benefit of the second output unit can be obtained. The notifications can then be received and outputted to a user by subscriber devices of the crowdsourcing network or other terminal devices that are at least temporarily located in the receiving range of the second output unit. In this case, one option is that only such devices that are authorized to do so are able to evaluate received warning notifications, error notifications and/or alerts. This may be ensured by knowing a key for a decryption or another association with the respectively emitting sensor. For example, this functionality may support personnel monitoring a plant or maintenance personnel.

In one embodiment, the data collection unit is configured for depositing received sensor data and/or positional information in a database, wherein the database is preferably configured for storing sensor data and positional information for each of the sensors together. In this case, the database may be a constituent element of the data collection unit or be connected in a communicating manner with the data collection unit. Depositing received data in a database permits storing the data in a clear-cut, structured and resource-saving manner. In this case, one option is that received sensor data and positional information from the same source, i.e. from the same sensor and/or the same sensing unit, are stored with a link to one another. This may take place by storing them in the same data record, or by storing a unique reference. Joint storing “for each sensor together” means that sensor data and/or positional information received over a period by a sensor are stored with a link to one another, e.g. by storing a reference (e.g. an identification number of the sensor) and/or by storing them in a common data record. In this way, the use of acquired data can be simplified.

In one embodiment, the system additionally comprises a supplying unit, wherein the supplying unit is configured for outputting sensor data and/or positional information stored by the data collection unit to a terminal device of a user. This permits the use of obtained data by a user. In this case, the supplying unit may supply the user with the data such that the transmission of the sensor data and positional information via different paths does not become visible to the user. Thus, the use of data transmitted with the technology disclosed in the present case does not differ from the use of known transmission technologies. In one embodiment, the supplying unit may include a web server that supplies the user with the sensor data and/or positional information collected and stored by the data collection unit, e.g. displays them graphically. In another embodiment, the supplying unit may include an inventory system which supplies a user with sensors that are in use, their place of use, their condition and/or other potentially relevant information.

In one embodiment, the supplying unit is configured for performing, based on predefined or definable access authorizations, an authorization check for an access to stored sensor data and/or positional information. In this way, unauthorized access can be prevented and/or different users can be shown different data and/or different levels of detail of the data. At the same time, a contribution to theft protection can thus be made. It is also possible that an access authorization is given for a particular occasion and/or temporarily. For example, this may make it easier for maintenance personnel to find a defective sensor and/or a sensor to be maintained and/or to estimate the duration of a maintenance job.

In one embodiment, the second output unit comprises a separate power supply unit, or a separate power supply unit is assigned to the second output unit, wherein the separate power supply unit is configured for supplying the second output unit and preferably comprises a battery and/or energy harvesting means. In this way, positional information can be transmitted even if the sensor is currently not operation, e.g. when storing the sensor in a warehouse or during a transport of the sensor. A battery may be a button cell, for instance. Energy harvesting means that electric energy is obtained from other forms of energy present at the site of use of the sensor, e.g. energy from electromagnetic fields, energy from variable magnetic fields, vibrational energy or thermal energy.

Other advantages and features of the invention become apparent from the following description of exemplary embodiments of the invention, which shall be understood not to be limiting and which will be explained below with reference to the drawing. In this drawing:

DETAILED DESCRIPTION OF THE DRAWINGS

Figure 1:
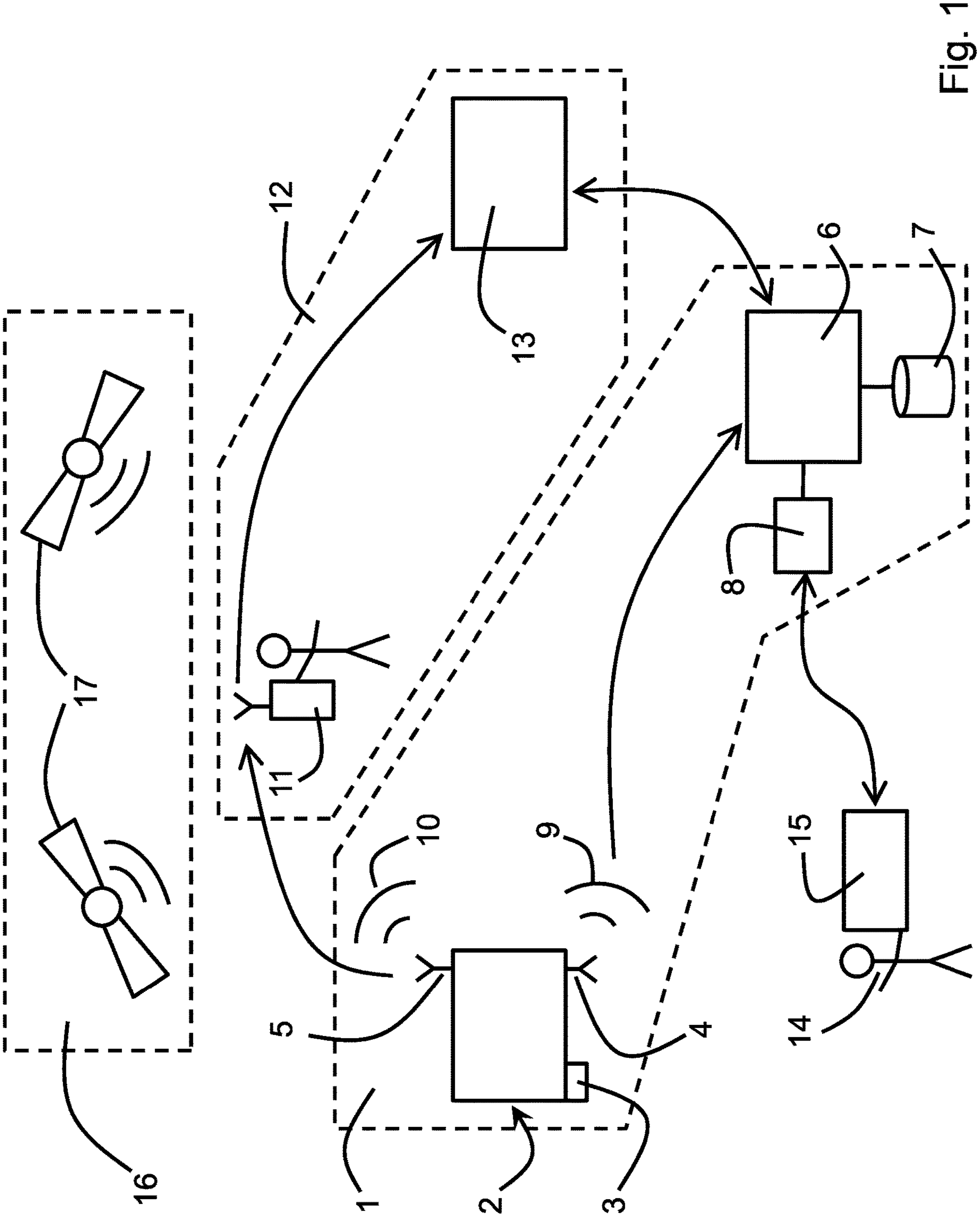
FIG. 1 shows a schematic representation of an exemplary embodiment of a system according to the present disclosure together with individual constituents of a crowdsourcing network.

FIG. 1 schematically shows constituent elements of an exemplary embodiment of a system 1 according to the present disclosure as well as its basic mode of operation in combination with other components. The system 1 comprises at least one sensor 2, of which only a single sensor 2 is shown in FIG. 1 for the sake of clarity. The sensor 2 comprises a sensing unit 3, which is schematically shown in FIG. 1 as a rectangle. The sensor 2 further comprises a first output unit 4 and a second output unit 5, each of which is indicated in FIG. 1 by an antenna symbol. It may be pointed out that the two output units 4, 5, in addition to an antenna, may of course include other components, e.g. an encoding unit, a modulating unit and an amplifier. The first output unit 4 is configured for outputting into a wide area network, e.g. LoRaWAN, NB-IoT, GSM or the like, and the second output unit 5 is configured for a short-range output, e.g. by means of Bluetooth, UWB or the like. The system 1 further comprises a data collection unit 6, a database 7 and a supplying unit 8, wherein the database 7 and the supplying unit 8 are each connected to the data collection unit 6 in a communicating manner. The data collection unit may be integrated into an inventory system or connected therewith in a communicating manner.

During the operation of the system 1, the sensing unit 3 detects a physical quantity, e.g. a filling level, a pressure, or a temperature, and generates sensor data therefrom. For this purpose, the sensor may include a control circuit for controlling the sensing unit 3, an evaluation unit for evaluating the electrical signals of the sensing unit 3, a filter unit, an analog/digital converter, a linearization unit and other components. The sensor data are emitted by the first output unit 4. In FIG. 1, the emitted sensor data are symbolized as radio waves, which are given the reference numeral 9. The output of the sensor data 9 may occur periodically, e.g. after a second, 15 seconds or a minute have elapsed. In this case, data from several measurements can be outputted together when the sensor data 9 are emitted. The sensor data 9 are received by the data collection unit 6, which stores the sensor data 9 in the database 7, wherein the sensor data 9 of one sensor 2 are stored together, e.g. in a joint data record or a joint data structure.

The second output unit 5 periodically emits a beacon 10, which is also symbolized in FIG. 1 as radio waves. A subscriber device 11 of a crowdsourcing network 12 passing by coincidentally is located within a receiving range of these radio waves in FIG. 1. The subscriber device 11 receives and processes the beacon 10, which in this manner triggers in the crowdsourcing network 12 the generation and transmission of positional information (and possibly other information, such as an ambient air pressure or an ambient temperature). The subscriber device 11 can determine its own position using a GNSS 16, of which two satellites 17 are shown as an example in FIG. 1. In order to process the beacon 10, the subscriber device 11 extracts an identifier transmitted with the beacon and, together with its own position, possibly with information on the distance from the second output unit 5, and possibly with other information, sends it to a crowdsourcing cloud system 13, which forms a central point of the crowdsourcing network. There, the received information is processed and positional information for the second output unit 5 is generated. This positional information is then transmitted to the data collection unit 6. The communication between the crowdsourcing cloud system 13 and the data collection unit 6 is symbolized by a double-headed arrow; that means that a bidirectional communication is taking place. Thus, for example, the data collection unit 6, presenting an identifier of an enquiring sensor, can initiate in the crowdsourcing cloud system 13 a generation of positional information or retrieve positional information existing for an identifier in the crowdsourcing cloud system 13. In principle, however, it would also be conceivable that the crowdsourcing cloud system 13 automatically transmits generated positional information to the data collection unit 6 together with an identifier of the associated sensor. The data collection unit 6 stores received positional information in the database 7. Since the data collection unit 6 knows the identifier of the respective sensor, the positional information can be stored together with the sensor data of the sensor 2, e.g. by referencing using the identifier or by storing them in the same data structure or data record.

The supplying unit 8 constitutes an interface for an access to data that have been stored in the database 7. For this purpose, a user 14 may connect to the supplying unit 8 using a terminal device 15, e.g. a laptop, a tablet or a smartphone, and retrieve and process sensor data, positional information and other information released to the user 14. A connection between the terminal device 15 and the supplying unit 8 may be effected by means of HTTPS (Hypertext Transfer Protocol Secure), for example.

Figure 2:
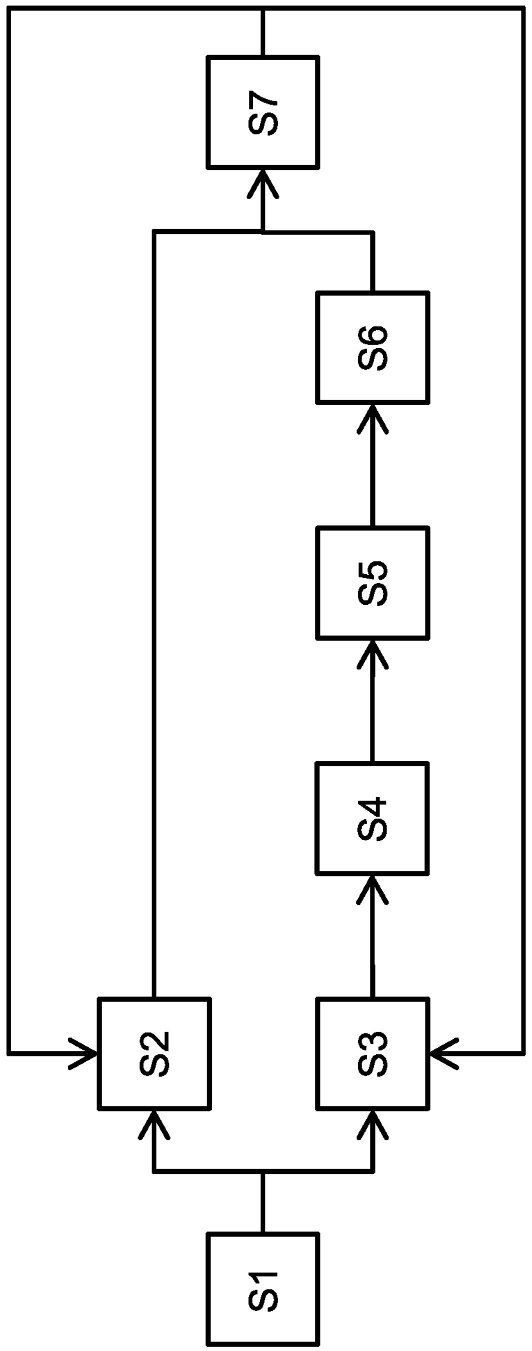
FIG. 2 shows a flow chart of an exemplary embodiment of a method according to the present disclosure.

FIG. 2 shows a flow chart for an exemplary embodiment of a method according to the present disclosure. In step S1, the system is first started and initialized. In step S2, generated sensor data are emitted to the data collection unit 6 by means of the output unit 4. In step S3, a beacon is emitted by the second output unit 5, which is received by a subscriber device 11 of a crowdsourcing network 12 in step S4. In step S5, positional information is generated based on the beacon and based on a position of the subscriber device 11, which is forwarded to the data collection unit 6 in step S6. In step S7, the sensor data and/or positional information are received by the data collection unit 6 and stored in the data base 7. Then the process is terminated or returns—possibly after a time of waiting—to step S2 and/or step S3. In this case, the cycle S2→S7→S2 and the cycle S3→S4→S5→S6→S7→S3 may be run through at different speeds.

In order to avoid repetitions, reference is made to the general part of the description and to the attached claims with respect to other advantageous embodiments.

Finally, it is expressly pointed out that the above-described exemplary embodiments serve only for explaining the teaching for which protection is claimed, but that they do not limit it to the exemplary embodiment.

The invention claimed is:

1. A system for transmitting sensor data and positional information of a sensor, comprising at least one sensor and a data collection unit, wherein the at least one sensor comprises in each case at least one sensing unit for detecting a physical quantity and is configured for generating sensor data based on the respectively detected physical quantity, wherein the at least one sensor, additionally, comprises in each case a first output unit and a second output unit, wherein the first output unit is configured for outputting generated sensor data to the data collection unit, wherein the second output unit is configured for emitting beacons into a crowdsourcing network, wherein the beacons are configured for triggering in the crowdsourcing network a generation of positional information and a transmission of the positional information to the data collection unit, using at least one subscriber device of the crowdsourcing network.

2. The system according to claim 1, wherein the first and second output units are configured for a wireless data transmission.

3. The system according to claim 1, wherein the first output unit comprises a wide area interface, wherein the wide area interface is formed by an interface for Long Range Wide Area Network (LoRaWAN), Long Term Evolution for Machine Type Communication (LTE-M), Narrow Band Internet of Things (NB-IoT), or Global System for Mobile communications (GSM).

4. The system according to claim 1, wherein the second output unit comprises a short-range interface, wherein the short-range interface is formed by an interface for Bluetooth or Ultra Wide Band (UWB).

5. The system according to claim 1, wherein the system is configured to evaluate generated sensor data with regard to the compliance with predetermined criteria and generates a warning notification, error notification and/or an alert in the case of non-compliance with predetermined criteria.

6. The system according to claim 5, wherein the system is configured for outputting the warning notification, error notification and/or alert via the second output unit.

7. The system according to claim 1, wherein the data collection unit is configured for depositing received sensor data and/or positional information in a database, wherein the database is configured for storing sensor data and positional information for each of the sensors together.

8. The system according to claim 1, which additionally comprises a supplying unit, wherein the supplying unit is configured for outputting sensor data and/or positional information stored by the data collection unit to a terminal device of a user.

9. The system according to claim 8, wherein the supplying unit is configured for performing, based on predefined or definable access authorizations, an authorization check for an access to stored sensor data and/or positional information.

10. The system according to claim 1, wherein the second output unit comprises a separate power supply unit, wherein the separate power supply unit is configured for supplying the second output unit, wherein the separate power supply unit is configured for energy harvesting and/or wherein the separate power supply unit comprises a battery.

11. A communication module for the sensor of the system according to claim 1, the communication module comprising a sensor data input, the first output unit and the second output unit, wherein the sensor data input is configured for inputting sensor data of the sensor, wherein the first output unit is configured for outputting generated sensor data to the data collection unit of the system, wherein the second output unit is configured for emitting beacons into a crowdsourcing network, wherein the beacons are configured for triggering in the crowdsourcing network a generation of positional information and a transmission of the positional information to the data collection unit, using at least one subscriber device of the crowdsourcing network.

12. A sensor for use in the system of claim 1, the sensor comprising, the first output unit, the second output unit, and the at least one sensing unit, wherein the at least one sensing unit is configured for detecting a physical quantity, wherein the system is configured for generating sensor data based on the respectively detected physical quantity, wherein the first output unit is configured for outputting generated sensor data to the data collection unit of the system, wherein the second output unit is configured for emitting beacons into a crowdsourcing network, wherein the beacons are configured for triggering in the crowdsourcing network a generation of positional information and a transmission of the positional information to the data collection unit, using at least one subscriber device of the crowdsourcing network.

13. The sensor according to claim 12 comprising a communication module having a sensor data input.

14. A method for transmitting sensor data and positional information of a sensor, comprising:

emitting generated sensor data by means of a first output unit of the sensor, wherein the sensor comprises at least one sensing unit for detecting a physical quantity and is configured for generating sensor data based on the respectively detected physical quantity, emitting a beacon into a crowdsourcing network by means of a second output unit of the sensor, wherein the beacon is configured for generating positional information in the crowdsourcing network, receiving the beacon by a subscriber device of the crowdsourcing network, generating positional information based on the beacon and a position of the subscriber device, forwarding the positional information to a data collection unit, and receiving and storing the sensor data and/or positional information by the data collection unit.

* * * * *